United States Patent [19]

Nagahara et al.

[11] Patent Number: 5,172,355
[45] Date of Patent: Dec. 15, 1992

[54] PHOTO-DETECTING DEVICE INCLUDING OFFSET CORRECTION

[75] Inventors: Shinichi Nagahara; Naoharu Yanagawa; Takaaki Matsumoto, all of Saitama, Japan

[73] Assignee: Pioneer Electronic Corporation, Tokyo, Japan

[21] Appl. No.: 704,158

[22] Filed: May 22, 1991

[30] Foreign Application Priority Data

Jun. 27, 1990 [JP] Japan .................................. 2-166627

[51] Int. Cl.$^5$ .............................................. G11B 7/095
[52] U.S. Cl. .............................. 369/44.32; 369/44.35; 369/44.41
[58] Field of Search .... 369/44.29, 44.32, 44.35–44.36, 369/44.41–44.42; 250/201.1, 201.5, 202

[56] References Cited

U.S. PATENT DOCUMENTS

| | | | |
|---|---|---|---|
| 4,794,244 | 12/1988 | Kimura | 250/201.5 |
| 4,815,060 | 3/1989 | Nomura | 369/44.42 X |
| 4,998,235 | 3/1991 | Ishibashi et al. | 369/44.41 X |
| 5,090,004 | 2/1992 | Ohsata et al. | 369/44.41 X |

*Primary Examiner*—Wayne R. Young
*Attorney, Agent, or Firm*—Sughrue, Mion, Zinn, Macpeak & Seas

[57] ABSTRACT

In the photo-detecting device, the light receiving surface of the light receiving element is divided into four sections A, B, C, D in the direction of tracking. To detect any tracking error, the quantities of received light on these four light receiving sections are used to calculate $\{(A+B)-(C+D)\}-\alpha\{(A-B)+(C-D)\}$, where $\alpha$ is an adjustable value such as a variable resistance. Since this provides a true tracking error which does not include a dc offset, it is possible to make a correct adjustment of the tracking.

2 Claims, 6 Drawing Sheets

PHOTO-DETECTING DEVICE INCLUDING OFFSET CORRECTION

BACKGROUND OF THE INVENTION

The present invention relates to a photo-detecting device in which a concentrated laser beam is radiated against an information recorded surface of an optical information recorded disc such as optical digital video disc and optical digital audio disc and in which the reflected light from the disc is received by a light receiving element to recover information from the disc.

PRIOR ART

A prior art photo-detecting device and its light receiving element are shown in FIG. 8 and 9.

In FIG. 8, reference numeral 1 represents a laser light generator; 2 a collimating lens to transform the laser light generated by the laser light generator 1 into parallel rays; 3 a beam splitter to either pass or reflect the laser beam according to the vibration plane of linear polarization; 4 a quarter-wave plate to rotate the vibration plane of linear polarization; and 5 an objective lens to focus the laser beam on an information recorded surface 6 of the information recorded disc.

The laser light that has passed through these devices and is reflected from the information recorded surface 6 is collimated by the objective lens 5 to become parallel rays, whose vibration plane is further rotated by the quarter-wave plate, before entering the beam splitter 3.

The reflected laser beam, whose vibration plane of linear polarization is rotated 90 degrees with respect to that of the original laser beam generated by the laser light generator 1, is reflected by the beam splitter 3 and focused by a lens 7 on a light receiving element 8.

When the laser beam striking the information recorded surface 6 is correctly aligned with a pit on the surface, the beam will form a beam spot on the light receiving element 8 such that dark areas of the spot on left and right divided surfaces 8a, 8b of the light receiving element 8 are symmetrical with each other, as shown shaded in FIG. 10.

If, however, the pit is deviated either left or right from the laser beam, i.e., when a tracking error occurs, the dark areas of the spot shift as shown in FIG. 11, resulting in a difference between the outputs of the left and right light receiving surfaces 8a and 8b. This output difference is used to adjust the laser beam to correct the tracking error.

In such a photo-detecting device, when the objective lens 5 is shifted $\Delta x$ from the beam axis, as shown in FIG. 12, the amount of light detected at the light receiving surface 8b increases and that at the light receiving surface 8a decreases since the center of the beam has the highest light intensity.

As a result, in a tracking error curve of FIG. 13, a dc offset $\Delta a + \Delta b$ corresponding to a change in the amount of light received at the light receiving surfaces 8a, 8b, occurs producing a tracking error signal Te. In the figure, $\epsilon$ represents the amount of shift in the beam center position.

The similar phenomenon takes place when the information recorded surface 6 of the disc is tilted as shown in FIG. 14.

That is, when the information recorded surface 6 tilts $\Delta\theta$ with respect to the beam axis, the beam center on the light receiving element 8 will shift $f \cdot 2\Delta\theta$, where f is the distance from the objective lens 5 to the information recorded surface 6. In the tracking error curve of FIG. 13, the dc offset equal to $\Delta a + \Delta b$ occurs also in this case. It is therefore necessary to correct these dc offsets.

SUMMARY OF THE INVENTION

The present invention has been accomplished with a view to overcoming the above drawback and its objective is to provide a photo-detecting device which is capable of detecting a true amount tracking error by detecting a dc offset and subtracting the dc offset from a detected tracking error signal.

To achieve the above objective, the photo-detecting device of this invention divides the light receiving element's surface that receives the rays of light reflected by the information recorded disc into four sections A, B, C, D in the direction of tracking and calculates $\{(A+B)-(C+D)\} - \alpha\{(A-B)+(C-D)\}$ as the tracking error by using the received light quantities.

PREFERRED EMBODIMENT OF THE INVENTION

Figure 1:
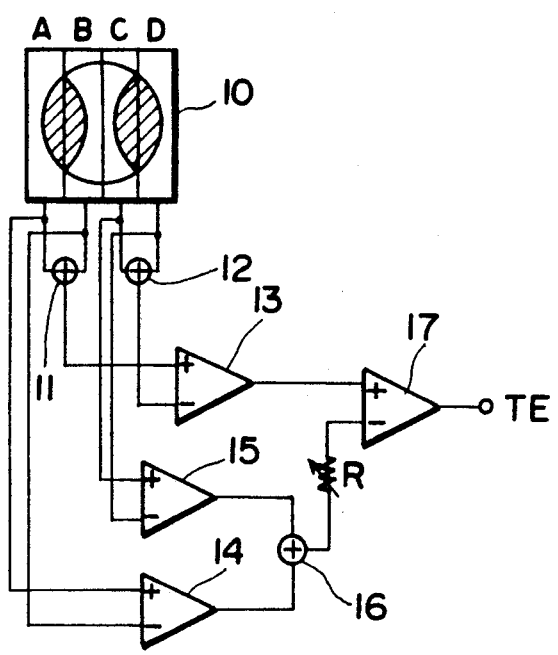
FIG. 1 is a circuit diagram showing one embodiment of this invention.
Figure 2:
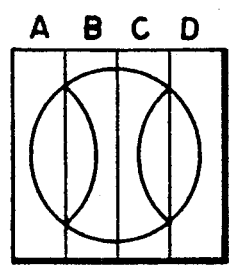
FIG. 2 is a front view of a beam spot located at the center of the light receiving element.

One embodiment of this invention will be described by referring to FIGS. 1 through 7.

The light receiving surface of a light receiving element 10 is divided into four sections A, B, C, D in the direction of tracking. The light quantities at the light receiving sections A, B are added up by an adder 11 and those at the light receiving sections C, D by an adder 12. The outputs of these adders 11, 12—(A+B) and (C+D) respectively—are supplied to a differential amplifier 13 which takes a difference between the adder outputs, i.e., a difference between the amounts of light received on the light receiving sections A, B on the left and on the light receiving sections C, D on the right, which is represented by the following expression:

$$\{(A+B)-(C+D)\} \qquad (1)$$

This difference constitutes a tracking error signal TE'. The tracking error signal, however, includes a dc offset component.

The light receiving sections A, B are connected to a differential amplifier 14 and the other light receiving sections C, D to another differential amplifier 15, to produce differences in received light quantity (A−B), (C−D). The outputs of the differential amplifiers 14, 15 are fed to an adder 16 so as to produce the added result, which is equivalent to a dc offset value obtained by the following formula:

$$\{(A-B)+(C-D)\} \qquad (2)$$

Therefore, a correct tracking error signal without a dc offset value can be, in theory, obtained by calculating the difference between the value of the expression (1) and that of (2).

But since each light receiving element 10 has its own peculiar offset value during its manufacturing process, it should be corrected by a correcting constant $\alpha$, and thus the correct tracking error is obtained by the following equation:

$$TE = \{(A+B)-(C+D)\} - \alpha\{(A-B)+(C-D)\} \qquad (3)$$

Figure 3:
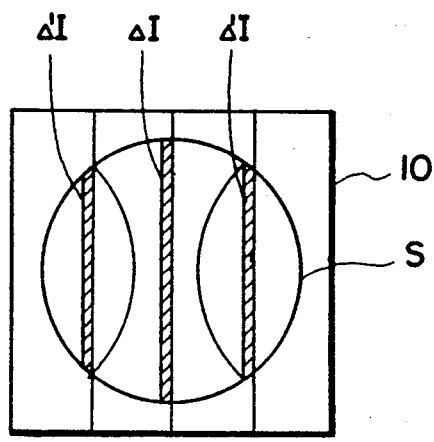
FIG. 3 is a front view of a beam spot shifted to the left.

Now, let us consider a case where a spot S is shifted to the left on the light receiving element 10 due to relative misalignment between the beam axis and the objective lens, as shown in FIG. 3.

In the figure, suppose the spot S deviates from the center of the light receiving element 10 toward left by $\Delta I$. The amount of light received at section A increases by $\Delta I'$ and that at section B changes by $-\Delta I' + \Delta I$. Also, at the sections C and D, the light quantity changes by $-\Delta I + \Delta I'$ and $-\Delta I'$, respectively.

Here, the sum of the received light quantity in the light receiving section A and that of section B is given by $(A+B) = \Delta I' + (-\Delta I' + \Delta I) = \Delta I$.

Likewise, the sum of the light received in the sections C and D is given by $(C+D) = -\Delta I + \Delta I' + (-\Delta I') = -\Delta I$, so that the output of the differential amplifier 13 which represents a tracking error including a dc offset value is given by the following equation:

$$(A+B)-(C+D)=2\Delta I \qquad (4)$$

In the same way, the difference in the received light quantity between the light receiving sections A and B is given by $$(A-B) = +\Delta I' - \Delta I' - \Delta I = 2\Delta I' - \Delta I$$

Likewise, the light receiving sections C, D have the following light quantity difference:

$$(C-D) = -\Delta I + \Delta I' + \Delta I' = 2\Delta I' - \Delta I$$

Hence, the dc offset which is represented by the output of the adder 16 is given by $$(A-B)+(C-D)=2\Delta I'-\Delta I+2\Delta I'-\Delta I=4\Delta I'-2\Delta I \qquad (5)$$

Figure 4:
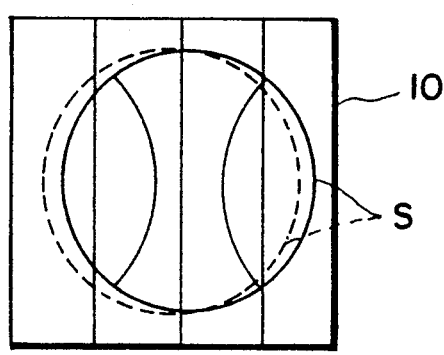
FIG. 4 is a front view of a beam spot shifted to the right.

On the other hand, when the spot deviates toward the right as shown in FIG. 4, a similar result is obtained with only the sign of expression (1) reversed. In this way, it is possible to know the direction of offset by checking the sign of the value of this equation.

Figure 5:
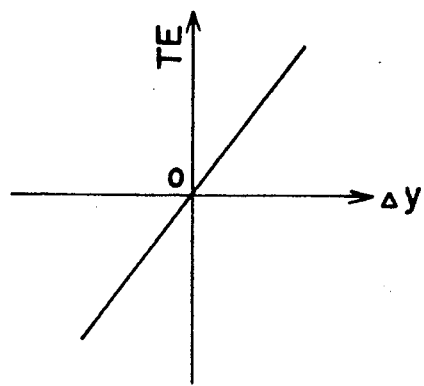
FIGS. 5 to 7 are diagrams explanatory of a correction value $\alpha$ for the dc offset.

Here, if the equations (4) and (5) are substituted into the equation (3), then $TE' = 2\Delta I - \alpha(4\Delta I' - 2\Delta I)$ is given, but since $\Delta I$ and $\Delta I'$ can be expressed as a ratio using a constant k in the form of $\Delta I' = k\Delta I$, the equation $TE' = 2\Delta I - \alpha(4k-2)\Delta I$ is finally given. Therefore, the relationship between the tracking error signal TE containing the dc offset and the deviation Y of the beam spot from the signal train may be expressed as shown in FIG. 5.

Figure 6:
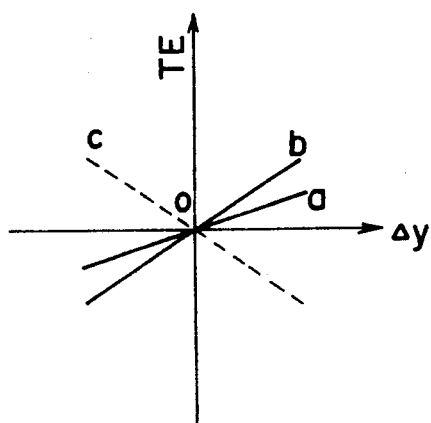
Figure 7:
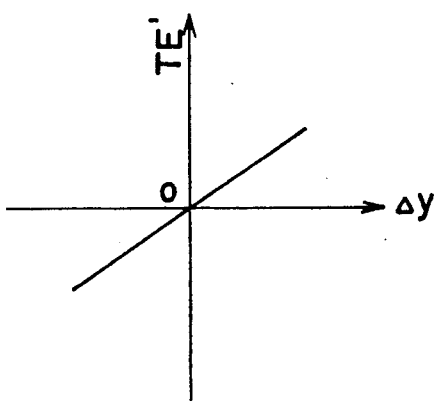
Figure 8:
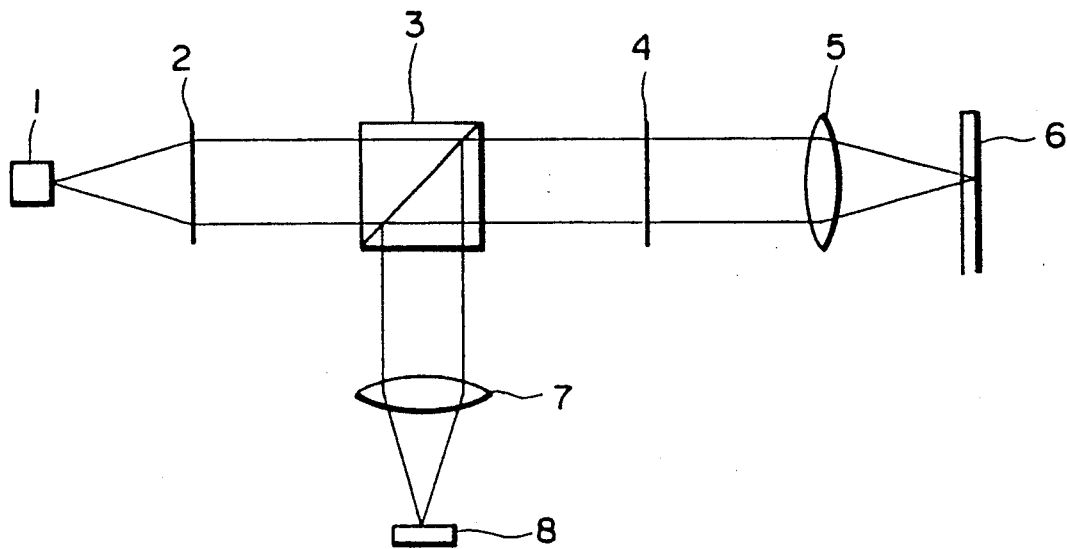
FIG. 8 is a schematic diagram showing the operation principle of the photo-detecting device.
Figure 9:
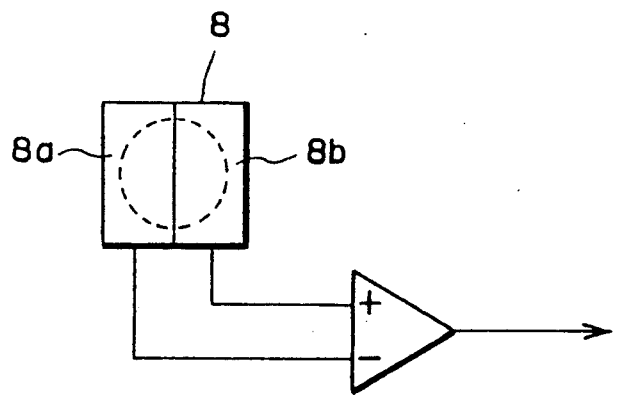
FIG. 9 is a front view of the light receiving surface.
Figure 10:
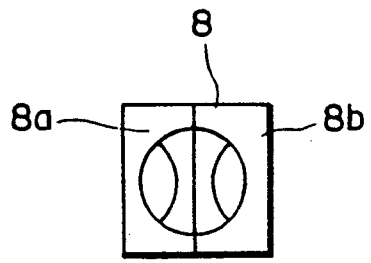
FIG. 10 is a front view of the light receiving surface and the beam spot when there is no tracking error.
Figure 11:
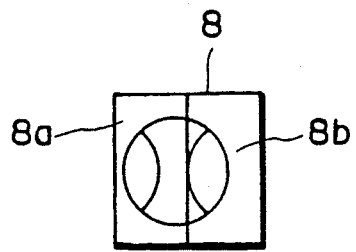
FIG. 11 is a front view of the light receiving surface and the beam spot when there is a tracking error.
Figure 12:
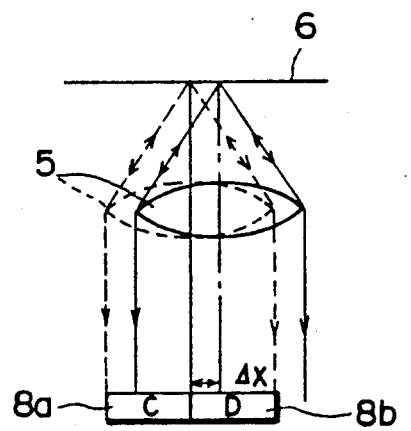
FIG. 12 is a schematic diagram showing the objective lens deviated from the beam axis.
Figure 13:
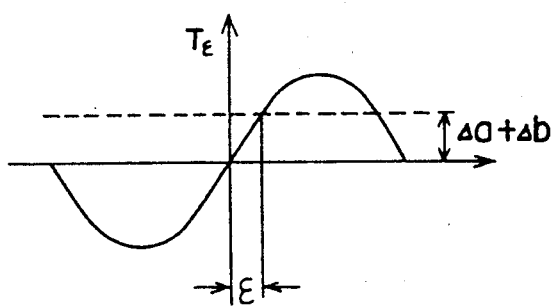
FIG. 13 is a diagram showing a tracking error signal.
Figure 14:
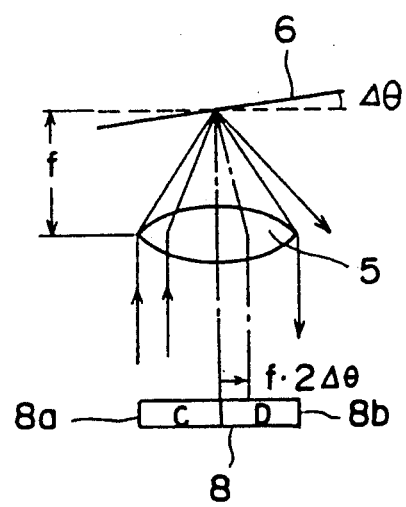
FIG. 14 is a schematic diagram showing the reflecting disc surface tilted with respect to the beam axis.

Further, the relationship between the dc offset and $\Delta y$ is expressed as shown in FIG. 6, in which a graph a represents a light quantity change and a graph b an electric quantity change converted by a dc offset correcting constant $\alpha$. By adding a graph c, a reciprocal of the graph b, to FIG. 5, it is possible to obtain a true amount of tracking error TE' as shown in FIG. 7.

The output of the adder 16, which is the sum of the outputs of the differential amplifiers 14, 15 in FIG. 1, is applied through a resistor R, which corresponds to the constant $\alpha$, to the differential amplifier 17 that also receives the output from the differential amplifier 13. The output of the differential amplifier 17 therefore gives the correct amount of tracking error TE'.

That is, this circuit performs a calculation:

$$\{(A+B)-(C+D)\} - \alpha\{(A-B)+(C-D)\}$$

Thus, during the process of manufacture the resistor R may be adjusted to provide an adequate value of $\alpha$, which in turn generates a tracking error signal that does not include the dc offset.

As described above, this invention divides the light receiving surface of the light receiving element into four sections A, B, C, D in the direction of tracking and performs the operation of $\{(A+B)-(C+D)\} - \alpha\{(A-B)+(C-D)\}$ where $\alpha$ is a variable value such as resistance, to calculate a tracking error signal that does not contain a dc offset. Thus it is possible with this invention to make a correct tracking adjustment without being influenced by the dc offset, which is generated by the deviation of the objective lens from the beam axis or by inclination of the information recorded disc.

What is claimed is:

1. A photo-detecting device comprising:
a light receiving element which receives light reflected from an information recorded disc, said light receiving element having its light receiving surface divided into four sections A, B, C, D in the direction of tracking ; and
a circuit to perform an operation of $\{(A+B)-(C+D)\} - \alpha\{(A-B)+(C-D)\}$ to calculate a correct tracking error not including a dc offset, wherein A, B, C and D are the quantities of light received at the corresponding light receiving sections, and $\alpha$ is a dc offset correcting constant for correcting the dc offset value peculiar to said light receiving element.

2. A photo-detecting device as claimed in claim 1, wherein said dc offset correcting constant $\alpha$ is realized as a variable resistance which is preadjusted during the process of manufacture thereof in said circuit so as to provide an adequate value thereto.

* * * * *